C. A. COMPTON.
WARMING RECEPTACLE.
APPLICATION FILED MAY 3, 1916.
1,223,311.
Patented Apr. 17, 1917.
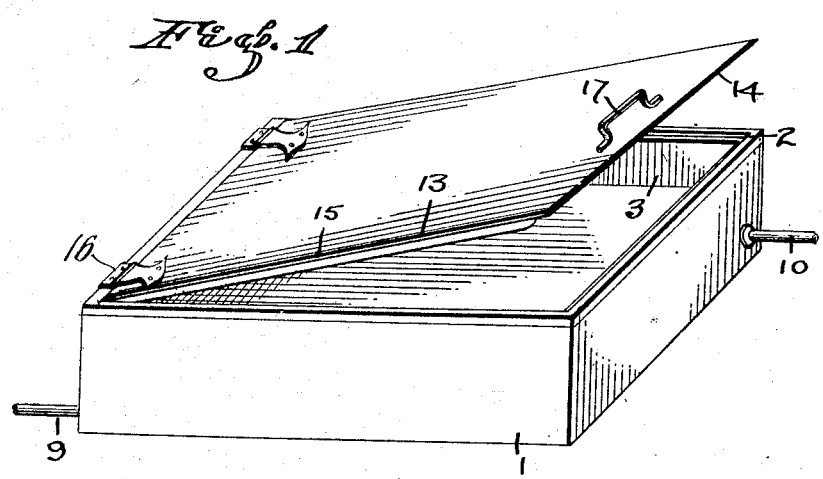
Fig. 1
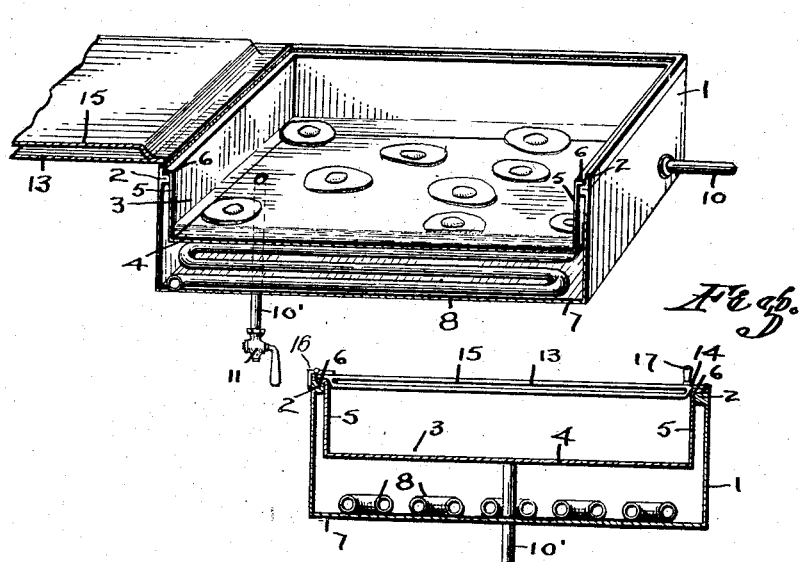
Fig. 2
Fig. 3
WITNESS
INVENTOR.
CHARLES A. COMPTON
BY
ATTORNEY.

UNITED STATES PATENT OFFICE.

CHARLES A. COMPTON, OF SAN FRANCISCO, CALIFORNIA.

WARMING-RECEPTACLE.

1,223,311.  Specification of Letters Patent.  Patented Apr. 17, 1917.

Application filed May 3, 1916. Serial No. 95,231.

*To all whom it may concern:*

Be it known that I, CHARLES A. COMPTON, a citizen of the United States, and a resident of the city and county of San Francisco, State of California, have made a new and useful invention—to wit, Warming-Receptacle; and I do hereby declare the following to be a full, clear, concise, and exact description of the same.

The invention relates particularly to a warming receptacle, especially adapted for use in restaurants and quick-lunch places, to preserve poached eggs in a condition suitable for instant use, but it will be understood that the warmer may be used in connection with other food products as well.

One of the objects of the invention is to provide a warming receptacle of extremely simple and practical construction having a pan suspended within a casing or container in which is a heating means whereby the contents of the pan may be maintained at a constant temperature.

Another more specific object of the invention is to provide a warming receptacle of this nature in which water contained within the pan that is suspended within the casing may be maintained at an approximately high temperature without danger of its rising to the boiling point, which would be disastrous to the proper preservation of poached eggs.

The invention also aims to generally improve devices of this nature, to render them more practical and useful, and commercially desirable.

In the specification and the annexed drawing, I illustrate the invention in the form that I consider the best, but it is to be understood that I do not limit myself to this form because the said invention may be embodied in other forms, and it is also to be understood that in and by the claims following the description, I desire to cover the invention in whatever form it may be embodied.

In the one sheet of drawings:

Figure 1 is a perspective view of the warming receptacle.

Fig. 2 is a broken perspective view of the receptacle showing the cover entirely open, and Fig. 3 is a transverse sectional view with the cover closed.

In detail the construction illustrated in the drawing comprises a casing generally designated by the numeral 1 and here shown as being rectangular, but which may be made in any other form if so desired. The case is preferably made of metal and is formed around its interior adjacent to its upper edge with an inturned supporting flange 2 which may be formed by doubling the metal back upon itself as shown by the drawing.

Within the casing 1 is suspended a pan 3 having a bottom 4 and walls 5 which are provided around their upper edges with an outwardly projecting flange 6 which rests upon and is supported by the inturned horizontal flange 2. This construction, as is evident, spaces the walls of the pan 3 from the walls of the container 1 and forms between said sets of walls a chamber surrounding the pan on all sides. The bottom 4 of the pan 3 is spaced a considerable distance from the bottom 7 of the casing 1, and within the chamber thus formed is provided a heating coil 8 which extends at one end outwardly through the casing 1 as indicated at 9 and which extends outwardly at its other end through the casing as indicated at 10. This coil, which may be of any suitable diameter and length, is for the purpose of conveying a heating medium, such as hot water or steam tortuously through the interior of the casing, thereby heating the space between the casing and the pan 3, which space may be hermetically sealed by the use of solder at the point of contact between the supporting flange 6 and the flange 2.

When used as a warmer for poached eggs, the pan 3 is partly filled with water, which because of the fact that the coil 8 does not contact at any place with the pan 3, may be easily maintained at an even temperature below the boiling point. A drain pipe 10′ having a valve 11 is provided for withdrawing the water from the pan.

A cover 13 fits snugly within the casing 1 and has a flange 14 which engages with the flange 6 and a thickened central portion 15 which engages the interior of the pan 1 as clearly shown. This cover may be secured to the casing 1 in any desired manner, but is preferably attached thereto by some means such as the hinges 16. A handle 17 is provided for conveniently raising or lowering the cover.

In using the device as a warmer for poached eggs, the pan 3 is partly filled with water which is raised to the desired temperature and maintained at this point by heat from the coil 8. The eggs are placed in the water and remain in condition for instantaneous use.

Attention is directed to the absence of water in the lower compartment between the pan and the casing insuring a dry heat therein. The absence of water or vapor prevents the transmission of excessive heat directly to the warming pan from the heating element. Experience has proven that the addition of water in the heating compartment below the pan results in a rise of temperature in the pan above 130° Fahrenheit with a deleterious effect upon the poached eggs therein. This receptacle is equally efficient as a warming receptacle for preserving toast and other foods if the water is omitted from the pan.

From the foregoing description taken in connection with the accompanying drawings, it will be apparent that I have provided a very simple and practical warming receptacle which may be cheaply manufactured and which is of great assistance in furnishing quick service in eating places.

I claim:

1. A warming receptacle comprising a casing, having an internal flange extending around the walls thereof, a pan adapted to fit within said casing in spaced relation to the walls, a flange formed on said pan to engage said first mentioned flange and support the pan below the top of said side walls, a heating element between the said casing and pan and means for covering the pan.

2. A heating receptacle comprising a casing, a flange extending around the interior of said casing near the upper edge thereof, a pan of smaller dimensions than the casing, a flange formed on said pan to rest upon said first mentioned flange and hold the pan suspended within the casing below the top of and in spaced relation to the walls thereof, a heating element between the pan and casing, and a cover for the pan hingedly secured to the casing.

In testimony whereof, I have hereunto set my hand at San Francisco, California, this 7th day of April, 1916.

CHARLES A. COMPTON.

In presence of—
RODNEY M. SMITH.

Copies of this patent may be obtained for five cents each, by addressing the "Commissioner of Patents, Washington, D. C."